Oct. 2, 1962  H. B. HUNTRESS ET AL  3,056,264
HYDRAULIC BRAKE CYLINDER
Filed July 13, 1959  3 Sheets-Sheet 1

INVENTORS:
HOWARD B. HUNTRESS
THOMAS S. TAYLOR
BY Wallace and Cannon
ATTYS.

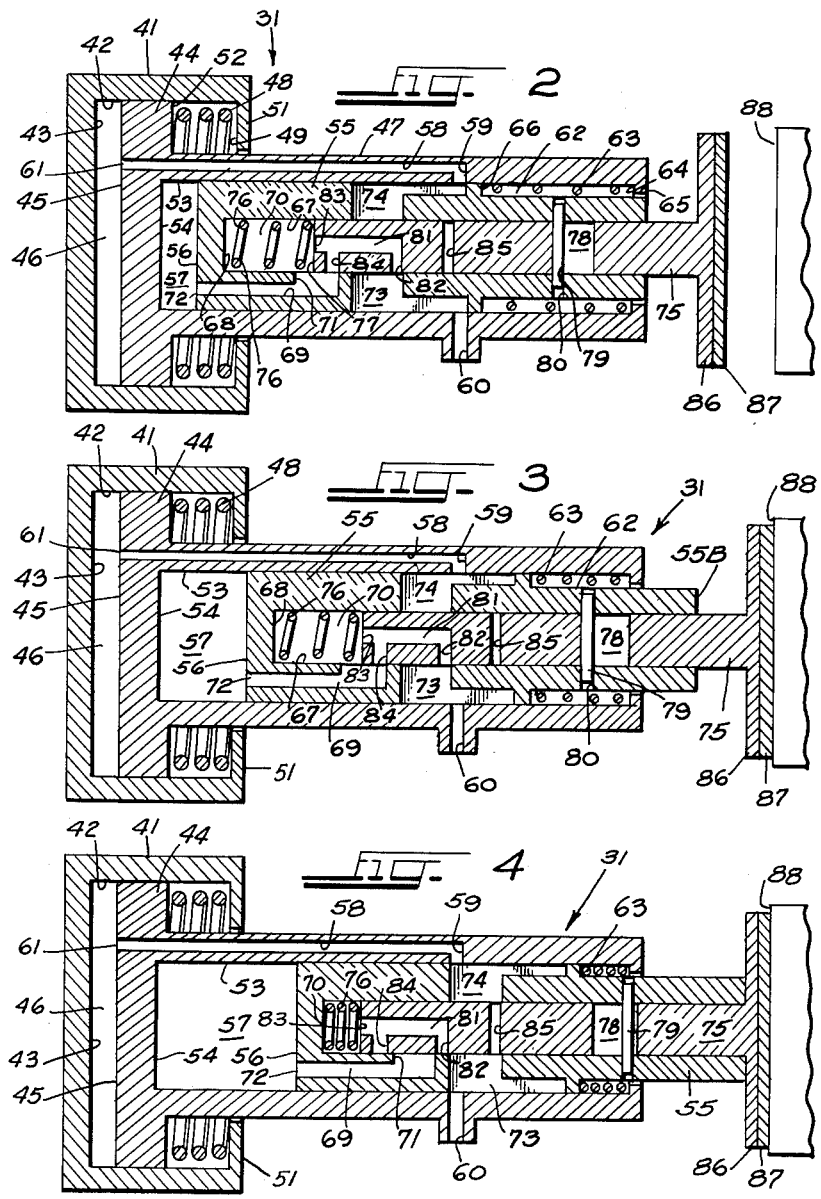

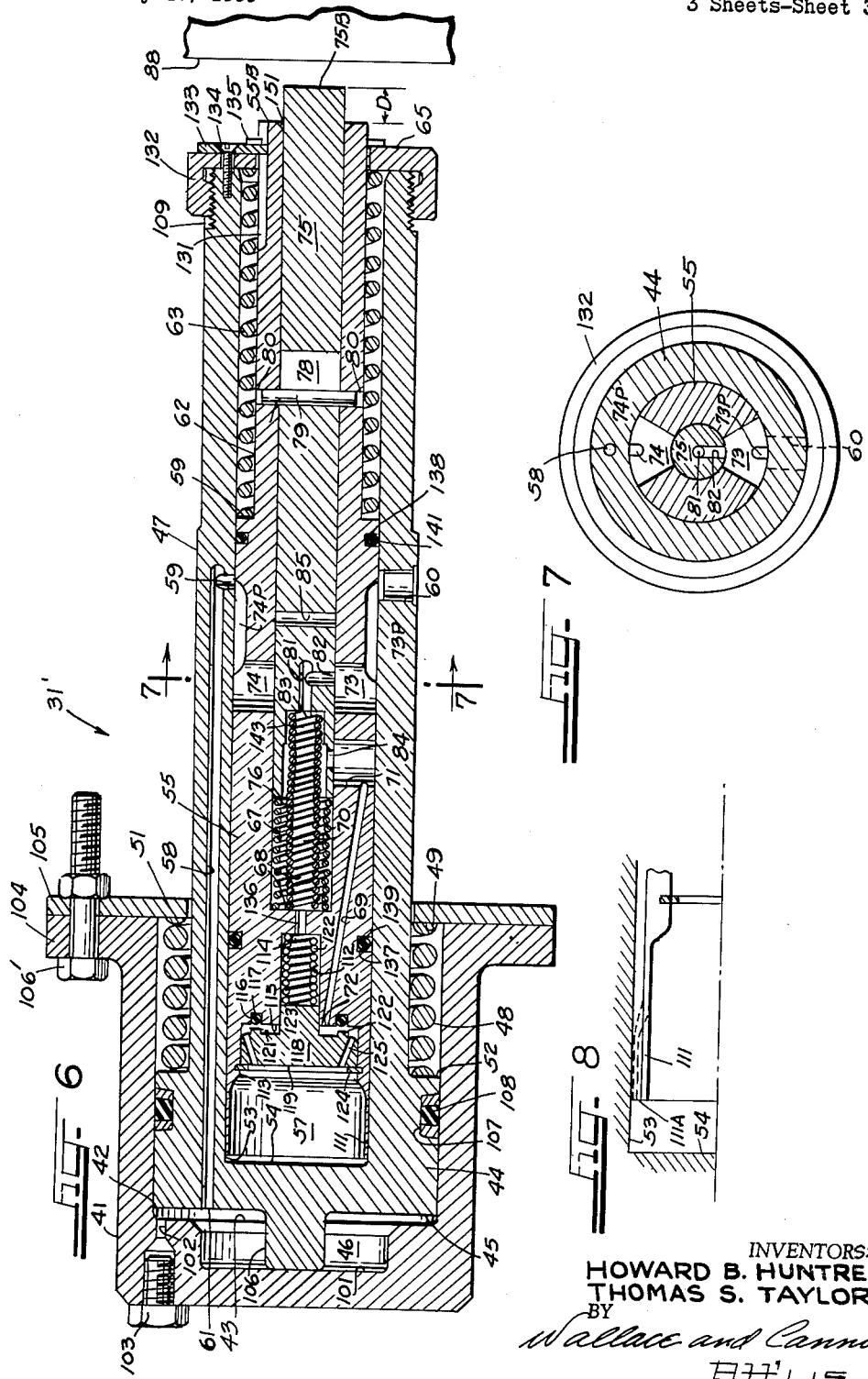

3,056,264
HYDRAULIC BRAKE CYLINDER
Howard B. Huntress and Thomas S. Taylor, Suffern, N.Y., assignors to American Brake Shoe Company, New York, N.Y., a corporation of Delaware
Filed July 13, 1959, Ser. No. 826,866
11 Claims. (Cl. 60—97)

This invention relates generally to hydraulic power cylinders and to a method of operating such cylinders.

More specifically, the invention relates to hydraulic power cylinders for use in a railway vehicle braking system, and to a braking system using such cylinders.

In the operation of friction-type brakes, repeated applications of the brake shoe to the braked surface results in a wearing down of the surface of the brake shoe. In this manner, the initial spacing between the brake shoe and the braked surface may be enlarged to a considerable extent so that an undesirable amount of free play or slack is developed in the braking system. Such slack necessitates increased travel of the component parts of the brake system and has heretofore resulted in a delay in the response of the brakes to braking signal. Thus, in a hydraulically actuated brake system the increased free play due to the wearing down of the braking surfaces necessitates extra travel of the master cylinder to take up this free play or slack before the brake shoe can be engaged with the braked surface. If no compensation is made for this wearing down of the braking surfaces, the continuing wear may result in ineffective braking.

The approach taken toward this problem of brake wear, in the prior art, has been that of providing some means to maintain a minimal spacing between the brake shoe and the wheel braking surface. Mechanical devices are most commonly employed. Such devices commonly provide an adjustable linkage which may be lengthened or shortened to compensate for the brake wear. Cams which can be rotated to reposition the entire shoe nearer to the braked surface are also employed. A somewhat related approach has been the trapping of a volume of hydraulic fluid between the master cylinder and the individual wheel cylinder to effectively lengthen the linkage between the master cylinder and the brake shoe and so reposition the brake shoe to a different starting position which is closer to the braked surface.

The mechanical wear compensating devices commonly require periodic mechanical adjustment and may operate properly only during the periods immediately subsequent to such adjustments. With the fluid trapping devices, it is sometimes difficult to manually decrease the amount of the fluid trapped so that replacement of worn brake shoes with new shoes presents a substantial problem in restoring the component parts to their original positions. A further drawback to the devices which trap a fluid to effectively lengthen the linkage to compensate for brake wear arises in drum brake applications. In such applications heat generated by the braking action can cause the drum to expand and create a larger gap between the drum and the shoe that permits the device to compensate by trapping a greater volume of fluid to lengthen the linkage in the same manner as if the gap were caused by lining wear. Upon cooling and contraction of the drum the shoes may drag. Such drag causes unnecessary brake wear and reduces the overall efficiency of the system of which the brakes comprise a part.

It is a primary object of this invention to provide a brake power cylinder which compensates for brake wear without requiring any repositioning of a shoe with respect to a braking surface.

It is another object of this invention to move an element rapidly into engagement with a resisting surface while exerting only a small force, to sense such engagement, and then to exert a large force through the element to the resisting surface.

It is another object of this invention to provide a compound hydraulic power cylinder having a relatively small expansible chamber motor disposed within a bore in a piston of a relatively large expansible chamber motor and to provide a sensing element in operative association with the two motors for selectively supplying a hydraulic fluid to each motor in a manner such that the smaller hydraulic motor is firmly engaged with a resisting surface before hydraulic fluid is supplied to the large motor to exert a large force on the resisting surface through the small motor.

It is another object of this invention to use an expanding cylindrical metal lip to form a static high pressure seal against the inside diameter of a cylindrical bore.

It is another object of this invention to use a compound piston having differential areas on opposite surfaces as a seal by simultaneously exerting an equal fluid pressure on both surfaces to cause the resulting differential force to move the piston into a sealing relation with a base surface.

It is another object of this invention to provide a self-contained hydraulic braking system utilizing a plurality of compound power cylinders for a railway car in a manner effective to utilize a susbtantially conventional air system both as a signal system and a power source to cause actuation of the hydraulic system.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 2 is a diagrammatic sectional view of a power cylinder, constructed in accordance with one embodiment of the invention, illustrating the initial disposition of the component parts prior to an application of a braking force;

FIG. 3 is a diagrammatic sectional view of the power cylinder of FIG. 2 illustrating the disposition of the component parts in an intermediate position which is obtained subsequent to the initial application of the braking force but prior to the application of the full braking effort;

FIG. 4 is a diagrammatic sectional view illustrating the disposition of the component parts of the cylinder of FIG. 2 with the full braking force applied;

FIG. 6 is a detail sectional view of a specific embodiment of a compound power cylinder constructed in accordance with this invention;

FIG. 7 is a sectional view taken in the direction of the arrows 7—7 of FIG. 6; and FIG. 8 is a schematic view illustrating a sealing action of a portion of the embodiment illustrated in FIG. 6.

Existing braking systems for railway vehicles almost universally use compressed air as a signal system and as a power source to cause actuation of the respective individual wheel braking units. In accordance with this invention, there is provided a self-contained hydraulic braking system, utilizing a specific power cylinder to actuate individual brake shoes, which is compatible with existing pneumatic braking systems. The manner in which the self-contained hydraulic system is connected to the pneumatic system to utilize existing air systems as a signal system and power source will now be described with reference to a braking system 10 illustrated in FIG. 1.

Figure 1:
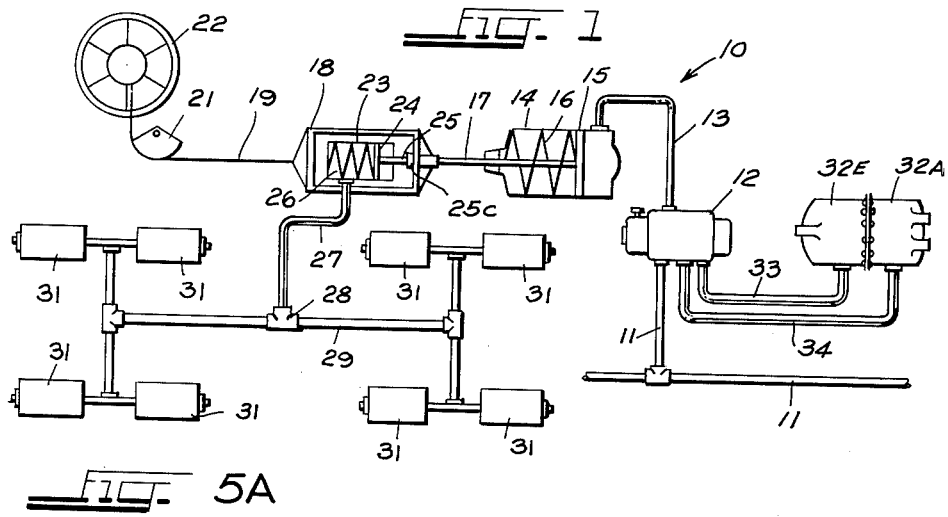
FIG. 1 is a schematic showing of a combined pneumatic and hydraulic braking system, particularly advantageous as applied to a railway car, and constructed in accordance with one embodiment of the invention.

In the system 10 of FIG. 1, a conduit 11 supplies compressed air to a brake regulating valve 12. With full line pressure in conduit 11 the valve 12 is positioned to connect the conduit 11 with two conduits 33 and 34 which are in turn connected to adjacent emergency and auxiliary air reservoir tanks 32E and 32A respectively. A conduit 13 is connected to the regulating valve at one end and is connected at the opposite end to a pneumatic cylinder 14. With full line pressure in conduit 11 the valve 12 is positioned to block any flow of compressed air through conduits 11, 33, or 34 to conduit 13. A piston 15 is slidably disposed within the cylinder 14. A spring 16, seated at opposite ends on an interior wall of the cylinder and the rod face of the piston, biases the piston inwardly of the cylinder. The piston 15 includes a rod 17 slidable in one end of a yoke 18. A hand wheel 22 is connected to the opposite end of the yoke 18 by a cable 19 which passes over a fixed bell crank 21. The yoke 18 is engageable with a collar 25C to move the rod 25 leftward as illustrated in FIG. 1 upon counterclockwise rotation of the hand wheel. A hydraulic master cylinder 23 is fixedly positioned within the yoke 18 and comprises a piston 24, slidable within the cylinder 23, and connected by a rod 25 to the yoke 18. A spring 26, seated against the head end of the piston 24 and an internal surface of the cylinder 23, biases the piston 24 outwardly of the cylinder 23. A conduit 27 is connected at one end of the piston 23 and is connected at its opposite end in a T-joint connection 28 to a hydraulic conduit 29. The hydraulic conduit 29 is connected to supply hydraulic fluid to each of a plurality of individual hydraulic power cylinders 31 which are described in detail hereinafter in the description relating to FIGS. 2-4, 6 and 7.

The air line 11, air regulating valve 12, pneumatic piston 14, hand brake 22, and the emergency reservoir 32 constitute items that are normally present on a railway vehicle for actuating the existing pneumatically powered brake cylinders. The self-contained hydraulic system comprising the master cylinder 23, the individual power cylinders 31, and the inter-connecting conduits 27 and 29 is compatible with the existing pneumatic system and thus requires very little modification for installation.

In the operation of the braking system 10 of FIG. 1, a braking action is initiated by bleeding pressure from the conduit 11. This decrease in the pressure in the conduit 11 shifts the valve 12 to permit a flow of compressed air from the tank 32A through the conduit 34 to the conduit 13. Such flow of compressed air within the conduit 13 generates a force within the pneumatic cylinder 14 to move the piston 15, the rod 17, and the piston 24 to the left, as illustrated, against the biasing force of the springs 16 and 26. This movement of the piston 15 forces the piston 24 of the hydraulic master cylinder 23 inwardly of the cylinder to move the hydraulic fluid out of the cylinder and through the conduits 27 and 29 to the individual wheel cylinders 31. This flow of hydraulic fluid to the cylinders 31 actuates the cylinders to move individual brake shoes (not shown) into engagement with the wheels of the railway vehicle in a manner specifically described hereinbelow.

The emergency air reservoir tank 32E constitutes a source of compressed air which can be connected to the cylinder 14 in addition to the reservoir 32A in order to increase the air pressure at the cylinder 14 in an emergency. As viewed in FIG. 1, the piston 24 of the hydraulic master cylinder 23 can also be actuated manually by counterclockwise rotation of the hand wheel 22 to engage the vehicle brakes.

The manner in which the hydraulic force is transmitted through the individual power cylinders 31 will now be described with particular reference to FIGS. 2-4, which diagrammatically illustrate an individual power cylinder in various phases of operation.

In FIG. 2 the power cylinder 31 comprises a relatively large diameter outer cylinder 41. The cylinder 41 is formed with a large internal diameter bore 42 which includes a base face 43. A piston 44 is slidably disposed within the bore 42 and includes a surface 45 at the head end of the piston. The surface 45 of the piston defines with the base face 43 and the side walls of the bore 42, an expansible chamber 46. The piston 44 is formed with an elongated shank 47 of reduced diameter. A spring 48 is seated at one end on an inner face 49 of an inwardly projecting flange 51 of the cylinder 41. At the opposite end the spring 48 is seated on a face 52 of the piston 44. The spring acts to bias the piston inwardly toward the base face 43 of the bore 42.

The piston 44 is provided with an internal bore 53 within the elongated section 47, the bore 53 having a base face 54. A conduit 58 is also formed within the piston 44 and includes a port 59 which communicates with the interior of the bore 53 and an opening 61 formed in the face 45 of the piston 44. Thus, the conduit 58 connects the interior of the bore 53 with the expansible chamber 46.

A piston 55 is slidably disposed within the bore 53 and includes a head end surface 56 which defines an expansible chamber 57 with the base face 54 and the side walls of the bore 53. The piston 55 has a shank 62 of reduced diameter at the end opposite the head end. A spring 63 is seated at one end on an interior face 64 of an inwardly projecting flange 65 of the piston 44. At its opposite end the spring 63 is seated on a face 66 of the piston 55 to bias the piston 55 inwardly of the bore 53 and toward the base face 54. The piston 55 has an internal bore 67 which includes a base face 68 formed therein. A conduit 69 is formed within the piston 55 and includes a port 71 communicating with the bore 67. At its opposite end the conduit 69 has an opening 72 in the surface 56 of the piston 55. Thus, the expansible chamber 57 is in communication with the internal bore 67. The piston 55 has a slot 73 which communicates with the internal bore 67 at one end and provides a port in the external surface of the piston 55 at the opposite end. The piston 55 also has a slot 74 which communicates at one end with the internal bore 67 and provides a port in the external surface of the piston 55.

A plunger piston 75 is slidably disposed within the bore 67 and is biased outwardly of the bore by a spring 76 which is seated at one end on the base face 68 and at the opposite end on a head face 77 of the piston 75. A slot 78 extends through the piston 75 and is engaged with a roll pin 79 which in turn is contained within apertures 80 which are formed in the side walls of the section 62 of the piston 55. The side walls of the slot 78 and the roll pin 79 thus act as mutually cooperative stop means for limiting the extent to which the piston 75 is biased outwardly of the bore 67 by the spring 76. The slot 78 also permits the piston 75 to be moved inwardly of the piston 55 against the biasing force of the spring 76. It should be noted also that the roll pin 79 coacts with the slot 78 to prevent any rotation of the plunger 75 within the bore 67. The plunger 75 has a conduit 81 formed therein which includes at one end a port 82 which opens outwardly of the external surface of the piston 75. At the opposite end of the conduit 81 two ports 83 and 84 provide openings for communicating with the expansible chamber 70 and the valve port 71 respectively. The plunger 75 includes an additional conduit 85 which extends through the plunger 75 in spaced relation to the port 82.

A brake shoe 86 is carried by the base end of the plunger 75 and provides a support for a brake lining 87 which is mounted thereon. The surface against which the force of the power cylinder is to be exerted, which in this case may be the periphery of the vehicle wheel, is schematically illustrated at 88.

The compound power cylinder 31 thus constitutes a first hydraulic motor having an expansible chamber 46 of relatively large diameter. A second hydraulic motor having an expansible chamber 53 of relatively small diameter is disposed within the piston 44 of the first hydraulic motor. A third hydraulic motor having an expansible chamber 70 is disposed within the piston 55 of the second hydraulic motor.

In operation the component parts of the power cylinder 31 are disposed as illustrated in FIG. 2 at a time prior to the application of a hydraulic braking force through the conduit 60. Upon an application of a braking effort to the master cylinder 23, see FIG. 1, a flow of pressurized hydraulic fluid is forced through the conduits 27 and 29 and is transmitted to the interior of the cylinder 31 through port 60. The slot 73 is aligned with the port 82 and thus supplies the pressurized hydraulic fluid, through conduit 81, to the chamber 70. Ports 84 and 71 are aligned and supply the hydraulic fluid through the conduit 69 to the chamber 57. At this time no fluid can be transmitted to the large chamber 46 because the conduit 85 is displaced to a position wherein the external surface of the piston 75 blocks fluid flow between the slots 73 and 74.

The increased pressure within the chambers 57 and 70 causes the two pistons 55 and 75 to move outwardly of the bore 53 against the biasing force of the spring 63. These two pistons move as a unit until such time as the surface 87 of the brake shoe 86 engages the surface 88.

When this occurs the component parts are as illustrated in FIG. 3. The relative positions of the pistons 75 and 55 are such that a pressurized hydraulic fluid supplied through conduit 60 continues to be supplied to the expansible chamber 57 through the slot 73, the conduit 81, and the conduit 69. Thus the pressure in the chamber 57 continues to build up and exerts a force on the face 56 to slide the piston 55 along the piston 75, compressing the spring 76. This movement of the piston 55 with respect to the piston 75 continues until the outwardmost end 55B of the piston abuts the rear face of the brake shoe 86. This disposition of the component parts is illustrated in FIG. 4.

At this point in the operation of the power cylinder 31 the piston 55 is moved to a position in which the external surface of the piston 75 blocks off the port 71 so that the volume of hydraulic fluid within the chamber 57 is trapped within the chamber. In this position, also, the slots 73 and 74 both communicate with the conduit 85 of the piston 75 so that pressurized hydraulic fluid is supplied through the slots 73 and 74 and through the conduit 58 to the large expansible chamber 46. The large force generated within the chamber 46 by the pressurized fluid is transmitted through the trapped volume of the fluid within the chamber 57 and through the base face 55B of the piston 55 to the brake shoe 86.

Because of the small diameter of the piston 55, this piston is moved outwardly of the bore 53 and into engagement with the rear surface of the brake shoe 86 very rapidly, since a small volume of hydraulic fluid causes a large displacement of the piston within the bore 53. Thus, the spacing between the brake lining 87 and the surface 88 is relatively insignificant in so far as it affects the time required for such movement of the piston 55.

The plunger 75 acts as a sensing element, or a trigger, to actuate the main braking motor piston 44 only after the spacing, or slack, between the lining 87 and the surface 88 is taken up and the piston 55 is engaged with the brake shoe 86 to transmit a braking force to the brake shoe.

It should be noted at this point that the braking effort applied to the brake shoe 86, prior to the time that the main braking motor 46 is actuated, is relatively small by reason of the small diameter of the bore 57. Only after the slack has been taken up and the piston 55 has been engaged with the brake shoe 86 is hydraulic fluid supplied to the main motor chamber 46. Thus, virtually no displacement of the piston 44 is required and only a very small volume of hydraulic fluid need be supplied to the chamber 46 to generate a large braking force. Since the total displacement of hydraulic fluid required to engage the piston 55 with the brake shoe and to develop a large braking force within the main braking motor, chamber 46 is small, the time required for the brake to respond to the braking signal is quite short and may easily be made virtually constant for a wide range of spacings of the lining surface element 87 from the braked surface 88. Moreover, the braking force is substantially constant, regardless of the wear of the braking surface 87, since the main power stroke of the large piston 44 is not initiated until the brake is in operative contact with the surface of the braked element.

Figure 5A:
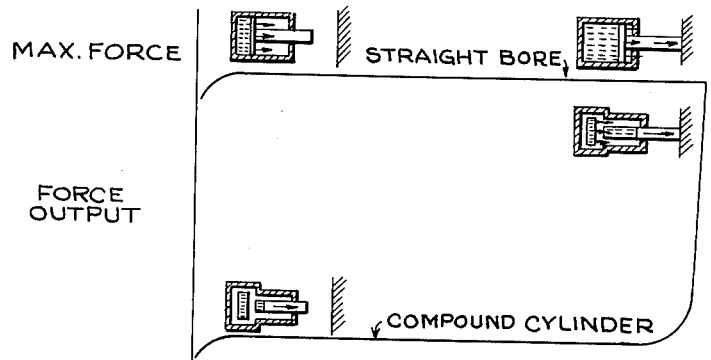
FIGS. 5A and 5B are diagrams on which certain parameters of operation of both a conventional single bore hydraulic cylinder and a compound hydraulic cylinder constructed in accordance with this invention are plotted.
Figure 5B:
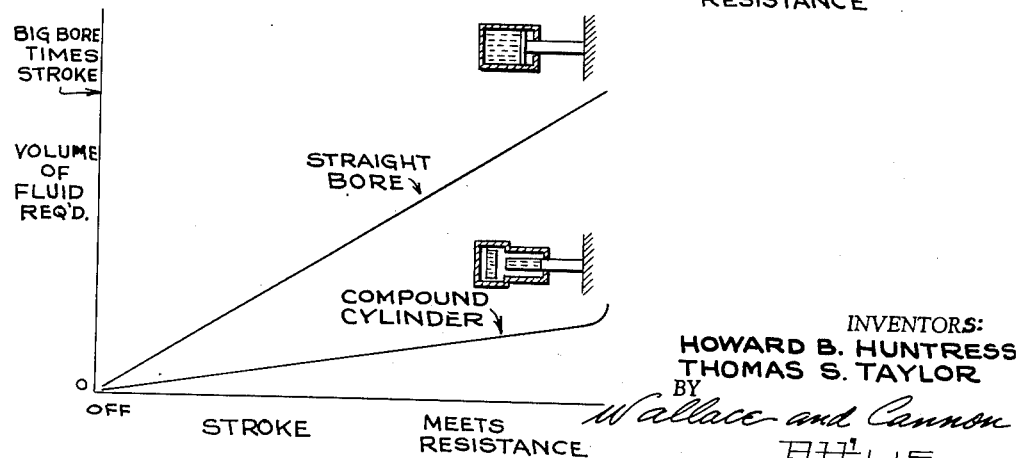

FIGS. 5A and 5B graphically illustrate the modes of operation of the compound power cylinder of this invention and of the single bore hydraulic power cylinder commonly employed. FIG. 5A shows that the force output of the compound cylinder is low over the greatest portion of the stroke, but increases to equal that of the single bore cylinder at the end of the stroke (when the load is encountered). The force output of the single bore cylinder is substantially constant throughout its stroke, even when this force output is not required until the end of the stroke. This excessive force output can result in undesirable piston accelerations. FIG. 5B shows that the compound cylinder consumes much less hydraulic fluid than the single bore cylinder throughout its stroke. Work is the product of pressure and volume, and the figures are plotted for equal pressures at the straight bore and compound cylinders. We may therefore conclude from FIG. 5B that for the same output stroke and end-of-stroke force, the compound cylinder requires much less work input than the straight bore cylinder.

In FIG. 6 a specific embodiment of a compound power cylinder 31' is illustrated in detail. Parts that correspond to like parts in the FIGS. 2–4 views are designated by like reference numerals. The main braking motor comprises an outer casing 41 having an inner bore 42 including a base face 43. The base face 43 of the bore 42 is formed with a recess 101. The casing 41 includes a flange 104 directed radially outwardly. An annular shaped-disc 105 is attached to the flange 104 by a plurality of fastening bolts 106', the inner portion of the disc 105 affording the inwardly directed flange 51.

A piston 44 is slidably disposed within the bore 42 and includes an elongated shank 47 of reduced diameter. A face 45 at the head end of the piston 44 defines an expansible chamber 46 with the base face and side wall of the bore 42. A lug 106 projects from the face 45 and abuts the face of the recess 101 to restrict the extent of the sliding movement of the piston 44 toward the base face 43. An annular recess 107 extends around the head end of the piston 44 and provides a seat having a sealing ring 108 therein. A return spring 48 is seated at opposite ends of a recess 52 of the piston 44 and the inner face 49 of the flange portion 51 of the annular disc 105. The piston 44 is also formed with an internal bore 53 having a base face 54 in the head end of the piston. A port 60 extends through a side wall of the shank 47 to transmit a pressurized fluid to the bore 53. A conduit 58 is formed within the piston 44 and communicates through an opening 61 with the expansible chamber 46 and through a port 59 with the bore 53. At its base end the piston 44 is externally threaded at 109 and an end cap 132 is received thereon.

A piston 55 is slidably disposed within the bore 53. At its head end the piston 55 has a tapered thin-walled cylindrical section 111 projecting along the sides of the bore 53 toward the base face 54. This thin-walled section is readily expandable by an internal pressure into an outward sealing relation with the side walls of the bore 53.

This relationship is schematically illustrated, in an exaggerated form, in FIG. 8. Thus the position of the flange 111 relative to the bore 53 is that illustrated by the solid outlines prior to a pressure being developed within the chamber 57. The flange 111 is expanded outwardly to the position indicated by the phantom outline 111A by an internal fluid pressure within chamber 57 to prevent any fluid flow between the flange and side walls of the bore 57.

The head end of the piston 55 is also formed with a bore 112 and a counter bore 113 having respective base faces 114 and 115. The head end of the piston 55 defines an expansible chamber 57 with the base face 54 and the side walls of the bore 53.

The annular-shaped base face 115 of the counterbore 113 is provided with an annular recess 116 which is spaced from and surrounds the periphery of the bore 112. An O-ring seal 117 is disposed within the recess 116.

The power cylinder 31' further includes a differential area piston 118 having a first portion slidable within the counterbore 113 and a second portion slidable within the bore 112. The piston 118 has a first surface 119 which faces the base face 54. A second surface 121 faces the base face 115 of the counterbore and includes an annular flange 122 projecting therefrom. The annular flange 122 is dimensioned and positioned so as to be receivable within the recess 116 to compress the O-ring 117 to provide an annular fluid-tight seal. A spring 122 is seated at opposite ends against a third face 123 of the piston 118 and against the base face 114 of the bore 112. The spring 122 biases the piston 118 outwardly of the bore 112. A retaining ring 124, seated within a recess in the counterbore 113, limits the extent to which the piston 118 can be moved outwardly of the bore 112. A conduit 125 has one opening in the portion of the annular-shaped face 121 which is disposed outwardly of the flange 122 and has another opening in the face 119 which connects the expansible chamber 57 with the space between the piston 118 and the base face of the counterbore.

At its base end the piston 55 is provided with a shank 62 of reduced diameter. The inner face of the end cap 132 provides a seating surface for one end of a return spring 63 disposed in coiled relation about the shank 62. At its opposite end the spring 63 abuts a recess face 59 to urge the head end of the piston 55 inwardly of the bore 53 toward the base face 54. A longitudinally extending keyway 131 is also formed in the circumferential surface of the base end of the piston 55. A lug 133 is retained within a radially extending recess in the end cap 132 by a screw 134. The lug 133 is engaged within the keyway recess 131 to prevent rotation of the piston 55 within the bore 53. A snap ring 135 seated in a circumferential recess in the base end of piston 55 abuts the external surface of the end cap 132 to limit the extent of the movement of the piston 55 toward the base face 54.

The piston 55 is also provided with an internal bore 67 having a base face 68. As can be seen more clearly in FIG. 7, the piston 55 is provided with a pair of slots 73 and 74 opening at one end to the bore 67 and opening in ports 73P and 74P in the external surface of the piston 55. A conduit 136 connects the bore 112 with the bore 67 to provide a relief conduit for the chamber inclosed by the bore 112 and the face 123 of the piston 118.

A conduit 69 formed within the piston 55 has an opening 72 in that portion of the face of the counterbore 115 which is disposed inwardly of the recess 116. At its opposite end conduit 69 opens into the side wall of a port 71 which in turn communicates with the bore 67. A pair of recesses 137 and 138 are formed around the outer circumference of the piston 55 and O-ring seals 139 and 141 respectively are disposed within the recesses. A pair of apertures 80 extend through the side walls of the shank 62 and a roll pin 79 is inserted through the apertures to extend across the diameter of the bore 67.

A plunger 75 is slidably disposed within the bore 67. The head end of the plunger 75 defines an expansible chamber 70 with the face 68 and side walls of the bore 67 and contains a bore 143. A slot 78 extends through the base end of the plunger and surrounds the roll pin 79 so as to permit a limited movement of the plunger 75 with respect to the piston 55. Coil springs 76, seated on the base face 68 and the head end of the plunger, bias the plunger 75 outwardly of the bore 67 until the slot 78 is engaged with the roll pin 79. In this position the base end of the plunger 75 projects beyond the base end of the piston 55 by a distance D. The piston 75 is formed with a conduit 81 opening at 83 to the expansible chamber 70 and having a port 82 opening in the external surface of the plunger. An additional port 84 extends through a side wall of the counterbored head portion of the plunger to communicate the chamber 70 with the slot 71 of the piston 55 with the two pistons in the relative positions illustrated in FIG. 6. An additional conduit 85 extends through the plunger 75 and has openings on opposite sides of the plunger.

The piston 55 has a beveled inner diameter edge 151 at its base end to facilitate initial assembly of the plunger 75 within piston 55.

The operation of the power cylinder 31' illustrated in FIG. 6 is basically that described in relation to the operation of the cylinder 31 of FIGS. 2 to 4. Thus, in its initial or unactuated position the parts of the power cylinder are disposed one relative to the other as illustrated in FIG. 6. To actuate the power cylinder to exert a force on the resisting surface 88, a flow of high pressure hydraulic fluid is transmitted to the interior of the power cylinder 31' through the port 60. The pressurized fluid flows through the slot 73, the port 82, and the conduit 81 to the chamber 70. From there the fluid flows through ports 84 and 71, through the conduit 69, the opening 72, and conduit 125 to the expansible chamber 57. Plunger 75 blocks any flow of fluid between slots 73 and 74 and thus prevents hydraulic pressure from being developed within the large expansible chamber 46.

The pressure generated within the chambers 70 and 57 causes the plunger 75 and the piston 55 to move outwardly of the bore 53 as a unit until such time as the face 75B of the plunger contacts the resisting surface 88. When this occurs the plunger 75 is restrained against further movement but the pressure generated within the chamber 57 continues to move the piston 55 outwardly of the bore 53 against the force of the springs 63 and 76 through distance "D" to engage the surface 55B of the piston with the resisting surface 88. This movement of the piston 55 with respect to the plunger 75 moves the port 71 out of register with the port 84 so that the fluid within the chamber 57 is trapped therein. This movement of the piston 55 with respect to the plunger 75 also moves the slots 73 and 74 into registry with the conduit 85 extending through the plunger 75, so that the pressurized hydraulic fluid is then transmitted through the conduit 58 to the large expansible chamber 46.

The pressure of the hydraulic fluid within the chamber 46 acting on the large diameter piston face 45 develops a large force which moves the piston 44 away from the base face 43 of the expansible chamber. This large force is transmitted by the piston 44 to the trapped volume of fluid within the chamber 57 to increase the pressure within the chamber. This increased pressure acts on both faces 119 and 121 of the differential area piston 118, being transmitted between the faces by the conduit 125, and, because the face 119 has more area on which the pressure can act than the face 121, the piston 118 is moved inwardly of the bore 112, rightwardly as illustrated, against the biasing force of the spring 122.

In this manner the flange 122 is caused to seat within the recess 116 and to compress the seal 117, forming an annular fluid-tight seal restricting any flow between the opening 72, which is disposed on one side of the seal, and the conduit 125 which is disposed on an opposite side of the seal. It should be noted at this point that the volume within the bore 112, which is displaced by inward movement of the piston 118, is relieved through the port 136, chamber 70, conduit 81, port 82 and slot 73.

The piston 118 provides a very effective fluid seal at one end of the chamber 57. The pressure generated within the chamber 57 acts to expand the tapered thin-walled flange 111 radially outwardly and into a fluid-tight sealing relation with the side walls of the bore 53, see FIG. 8. Thus, two static high pressure fluid seals are provided at the opposite ends of the chamber 57 to prevent any escape of fluid from the chamber. The sealing action of the seals is of a servo nature. Thus, higher pressures within the chambers force the seals into tight-sealing relation with the respective sealing surfaces. This is very important because the greater portion of the total braking effort is transmitted through the trapped fluid within the chamber 57.

As described in relation to FIGS. 2–4, the plunger 75 acts as a sensing element to trigger the main actuating force only after the force transmitting portion of the power cylinder is in positive engagement with the resisting surface. The relative diameters of the pistons 55 and 44 are such that a small volume of hydraulic fluid produces a large displacement of the piston 55. The small bore permits a small volume of hydraulic fluid to move the piston 55 rapidly into engagement with the resisting element 88 so that variations in the initial spacing between the face 55B and surface 88 do not significantly affect the time required for such engagement to occur after a flow of high pressure hydraulic fluid is initiated through the conduit 60. Once the faces 55B and 88 are engaged the application of the total force is almost instantaneous since only a small movement of the large piston 44 is required to develop this force. The total volume of the hydraulic fluid necessary to effect the initial engagement of the faces 55B and 88 and to develop the main force within the chamber 46 is therefore quite small.

When the hydraulic fluid pressure from conduit 60 is diminished back to its initial value the biasing springs 48, 122, 63, and 76 return the component parts of the power cylinder 31 to the position illustrated in a sequence of movements that is the reverse of those described above. Thus, the return spring 48 shifts the piston 44 inwardly of the bore 42, relieving the pressure within the chamber 57. Spring 122 shifts the compound piston 118 outwardly of the bore 112 and into engagement with the retaining ring 124. The spring 63 shifts the piston 55 inwardly of the bore until the snap ring 135 engages the end face of the end cap 132. The spring 76 shifts the plunger 75 outwardly of the bore 67 and into engagement with the roll pin 79. The power cylinder is thus returned to the initial, unactuated condition in preparation for another power cycle.

Thus in accordance with this invention there is provided a self-contained hydraulic brake actuating system for railway vehicles which is compatible with the conventional pneumatic braking systems. A brake power cylinder is provided which requires no adjustment of parts or repositioning of the brake shoes with respect to the braked surface as compensation for brake wear, since the volume of fluid consumed by the driven compound cylinders can never be sufficient to cause the brake power cylinder to travel its maximum stroke. A compound hydraulic power cylinder is provided which rapidly engages with a resisting surface, senses such engagement, and triggers a hydraulic motor to exert a large force against the resisting element. The compound power cylinder comprises two hydraulic motors relatively disposed so that the large force developed within one motor is transmitted through a trapped volume of hydraulic fluid within the other motor. Seal structure is provided which utilizes a thin cylindrical lip and utilizes also a compound differential area piston to provide very effective high pressure static seals to prevent leakage from a hydraulic fluid chamber.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. Thrust transmitting apparatus including thrust receiving means and a compound power cylinder comprising, an outer cylinder having a first internal bore including a base face, a first piston slidable within the first bore, having head and base ends, and having a second internal bore including a base face, a second piston slidable within the second bore, having head and base ends, and having a third internal bore including a base face, a third piston slidable within the third bore and having head and base ends, the head ends of the first, second, and third pistons being spaced from the base faces of the respective first, second, and third bores to form first, second, and third expansible chambers in the respective bores, the third piston having a first stop means formed therein, second stop means projecting from the second piston and engageable with the first stop means to limit the extent of the slidable movement of the third piston within the third bore, biasing means biasing the third piston so that the first stop means engages the second stop means at a first position wherein the base end of the third piston projects beyond the base end of the second piston, the first, second, and third pistons having interconnecting valving and conduit means disposed to supply a pressure fluid to the first and second expansible chambers and block the supply of a pressure fluid to the first expansible chamber in the first position of the third piston within the third bore, the second piston being slidable against the force of the biasing means by a predetermined magnitude of fluid pressure in the second expansible chamber and the engagement of the base end of the third piston with the thrust receiving means to a second position with respect to the third piston, movement of said second piston to said second position being effective to change the interconnections between said valving and conduit means to supply a pressure fluid to the first expansible chamber and block the flow of fluid to and from the first and second expansible chambers.

2. A power unit comprising, a first expansible-chamber motor including a cylinder and a first piston disposed therein to define therewith a first expansion chamber, said first piston having an internal bore, a second expansible-chamber motor including a second piston disposed within the internal bore of said first piston and defining therewith a second expansion chamber, said second piston having an internal bore, said first and second pistons including first and second conduits connected to said first and second chambers and having valve ports communicating with said internal bore of said second piston, and valve means mounted within said internal bore of said second piston for movement between first and second operating positions in which said valve means alternately blocks the valve ports for the conduits communicating with said first and second chambers to prevent a flow of fluid into and from said chambers.

3. A power unit comprising, a first expansible-chamber motor including a cylinder and a first piston disposed therein to define therewith a first expansion chamber, said first piston having an internal bore, a second expansible-chamber motor including a second piston disposed within the internal bore of said first piston and defining therewith a second expansion chamber, said first and second pistons including first and second conduits connected to said first and second chambers and having valve ports, and valve means mounted in said second piston for slidable movement with respect to both the first and second pistons, said valve means being movable between first and second operating positions in which said valve means alternately blocks the valve ports for the conduits communicating with said first and second chambers to prevent a flow of fluid into and from said chambers.

4. A compound power cylinder comprising, an outer casing having a first internal recess, a first piston slidably disposed within the first recess and having a second internal recess, a second piston slidably disposed within the second recess and having a third internal recess, a third piston slidably disposed within the third recess, the first, second and third pistons having head ends spaced from the base faces of the respective first, second and third recesses to form first, second and third expansible chambers in the respective recesses, the first, second, and third pistons having valve and conduit means for supplying a pressure fluid to the third and second expansible chambers and for blocking the flow of fluid to the first expansible chamber in one position of the third piston within the third recess, and for supplying fluid to the first expansible chamber and for blocking flow of fluid to and from the first and second expansible chambers in another position of the third piston within the third recess.

5. A power unit comprising a first expansible chamber motor including a cylinder and a first piston disposed therein to define therewith a first expansion chamber, said first piston having an internal bore, a second expansible chamber motor including a second piston disposed within the internal bore of said first piston and defining therewith a second expansion chamber, said second piston having an internal bore, said first and second pistons including first and second conduits connected to said first and second chambers and having valve ports communicating with said internal bore of said second piston, seal means for sealing off said second conduit from communication with said second chamber to permit a force to be transmitted from said first piston through a sealed volume of fluid in said second expansion chamber, and valve means mounted within said internal bore of said second piston for movement between first and second operative positions in which said valve means alternately block the valve ports for the conduits communicating with said first and second chambers to prevent a flow of fluid into and from said chambers.

6. A power unit comprising, a first expansible chamber motor including a cylinder and a first piston having a head end disposed therein and defining a first expansion chamber within said cylinder, the first piston having an internal bore in the end opposite said head end, a second expansible chamber motor including a second piston having a head end disposed within the internal bore of said first piston to define a second expansion chamber therein, said second piston having an internal bore in the end opposite said head end, said first and second pistons including first and second conduits connected to said first and second chambers and having valve ports communicating with said internal bore of said second piston, the head end of said second piston having an additional bore and a counterbore formed in the surface facing said second expansion chamber, the counterbore having an annular-shaped base surface and a conduit opening for said second conduit therein, a piston member slidable within the bore and the counterbore and having a third conduit having one opening communicating with the first expansion chamber and an additional opening facing the base surface of the counterbore, the conduit opening in the counterbore base surface and the additional opening in the piston member being radially displaced one from the other, seal means disposed between said openings and operative upon movement of the piston member axially inwardly of the counterbore to seal said second conduit from communication with said second expansion chamber, and valve means mounted within said additional internal bore of said second piston for movement between first and second operative positions in which said valve means alternately block the valve ports for the conduits communicating with the first and second chambers to prevent a flow of fluid into and from said chambers, whereby said valve means are operative in said second operative position to supply fluid to said first expansion chamber to generate a fluid pressure in said second expansion chamber and slide the piston member axially inwardly of the counterbore to actuate said seal means to seal the fluid within said second expansion chamber.

7. An expansible chamber motor comprising, a casing having an end wall and side walls which form a bore within the casing, a piston slidable within the bore and having a piston head, the piston head, end wall and side walls of the casing defining an expansible chamber, said piston head having a flexible thin-walled flange projecting into the expansible chamber in slidable engagement with the side walls of the expansible chamber, the flexible flange being expandable into fluid-tight sealing relation with the side walls of the expansible chamber by an internal pressure within the chamber, the piston head having a bore and counterbore formed therein, the counterbore having an annular-shaped base surface and a conduit opening therein, a differential area piston slidable within the bore and counterbore and having a conduit formed with one opening in communication with the expansible chamber and an additional opening facing the base surface of the counterbore, the conduit opening in the counterbore base surface and the additional opening in the differential area piston being radially displaced one from the other, and seal means disposed between said openings, whereby movement of the differential area piston toward said counterbore base surface actuates said means to form a fluid-tight seal between the base surface conduit opening and the additional opening within the differential area piston.

8. A seal assembly comprising, a member having a first conduit therein and having a bore and a counterbore disposed within one end of the member, cylinder means disposed in encompassing relation to said one end of the member to afford an expansible chamber opening into the counterbore, the counterbore having an annular-shaped base surface and a first opening for said first conduit therein, a piston having a first head portion slidable within the counterbore and having a second head portion, which projects from a face of the first head portion, slidable within the bore, the first head portion having a second conduit extending therethrough and having a second opening for said second conduit facing said counterbore base face, said first and second openings being radially displaced one from the other, compressible seal means disposed between said first and second openings, stop means mounted in the counterbore and operative to restrict the sliding movement of the piston, resilient means disposed within the bore and biasing the piston toward the stop means, whereby the piston is slidable axially inwardly of said counterbore by a fluid pressure, transmitted through said second conduit into said expansible chamber, to compress the seal means and prevent fluid flow between said first and second openings and is slidable axially outwardly and into engagement with said stop means by said resilient means to permit fluid flow around said seal means and between said first and second openings.

9. A seal assembly comprising a member having a first conduit therein and having a bore and a counterbore disposed within one end portion of the member, cylinder means disposed in encompassing relation to said one end of the member to afford an expansible chamber opening into the counterbore, the counterbore having an annular-shaped base surface and a first opening for the first conduit therein, a piston having a first portion slidable within the counterbore and an annular surface facing the counterbore base surface, said piston having a second portion, which projects from the annular surface and which is slidable within the bore, engageable sealing means formed on said annular surface and said counterbore base surfaces, the first portion of said piston having a second conduit extending therethrough and having an opening in a portion of said annular surface, said seal means being disposed between said first and second conduit openings, whereby the second conduit transmits a fluid pressure through the piston into said expansible chamber to exert an unbalanced pressure force on said first portion and slide said piston axially inwardly of the counterbore to engage said seal means and prevent fluid flow between said first and second conduits.

10. A seal assembly comprising, a member having a base surface, the member having a bore opening in the base surface, said base surface having seal means spaced from and surrounding the bore and having a first conduit opening in a portion of the surface intermediate the seal means and the bore, side walls extending perpendicular from the base surface, cylinder means closing off the end of said side walls to define therewith an expansible chamber, a differential area piston having a first part slidable within the side walls and a second part slidable within the bore, the first part of said piston having a first surface facing the base surface and a second surface disposed on an opposite side of the first part, said first surface having a lesser projected area than said second surface, the first part of the piston having a conduit connecting the first and second surfaces of the piston, the conduit having an opening in the first surface outwardly of the seal means, and biasing means within the bore biasing the piston outwardly of the bore, whereby a pressure in said chamber exceeding a predetermined magnitude acts on the differential areas of the first and second surfaces to force the piston against the force of the biasing means to a position wherein the seal means provide a fluid-tight seal between the conduit opening in the base surface and the conduit opening in the first surface of the piston.

11. In a power unit of the kind wherein a first expansible chamber motor is disposed concentrically about a second expansible chamber motor for exerting a thrust on a resisting surface through the fluid within the expansion chamber of said second expansible chamber motor, a plunger arranged within the second expansible motor for sensing an engagement of the second expansible chamber motor with a resisting surface, and valve means concentrically inward of the said first expansible chamber motor and operative upon such engagement to initiate a supply of actuating fluid to said first expansible chamber motor and discontinue a supply of actuating fluid to said second expansible chamber motor upon such engagement of said second expansible chamber motor with a resisting surface.

References Cited in the file of this patent

UNITED STATES PATENTS

| | | |
|---|---|---|
| 2,139,387 | Schweiss | Dec. 6, 1938 |
| 2,514,588 | Nystrom et al. | July 11, 1950 |
| 2,667,035 | Marsden | Jan. 26, 1954 |
| 2,826,277 | Hawley | Mar. 11, 1958 |
| 2,829,498 | Ferguson | Apr. 8, 1958 |
| 2,915,348 | Arnold et al. | Dec. 1, 1959 |

FOREIGN PATENTS

| | | |
|---|---|---|
| 521,980 | Great Britain | June 5, 1940 |